United States Patent [19]
Ohmory et al.

[11] Patent Number: 5,861,213
[45] Date of Patent: Jan. 19, 1999

[54] FIBRILLATABLE FIBER OF A SEA-ISLANDS STRUCTURE

[75] Inventors: Akio Ohmory; Hayami Yoshimochi; Tomoyuki Sano, all of Kurashiki; Satoru Kobayashi, Okayama; Syunpei Naramura, Kiyone-Village; Masahiro Satoh, Kurashiki, all of Japan

[73] Assignee: Kuraray Co., Ltd., Kurashiki, Japan

[21] Appl. No.: 726,930

[22] Filed: Oct. 7, 1996

[30] Foreign Application Priority Data

| Oct. 18, 1995 | [JP] | Japan | 7-269619 |
| May 15, 1996 | [JP] | Japan | 8-119922 |
| Aug. 9, 1996 | [JP] | Japan | 8-211110 |

[51] Int. Cl.$^6$ .............. D01F 6/14; D01F 6/00; D01D 5/12; C08F 16/06
[52] U.S. Cl. .............. 428/397; 428/359; 428/360; 428/373; 428/374; 428/394; 428/398; 428/399; 428/400; 428/401; 264/185; 264/210.7; 264/210.8
[58] Field of Search .............. 428/397, 374, 428/373, 359, 360; 525/56–60, 394, 398, 399, 400, 401; 264/185, 210.7, 210.8

[56] References Cited

U.S. PATENT DOCUMENTS

| 4,968,561 | 11/1990 | Mizobe et al. . |
| 5,110,678 | 5/1992 | Narukawa et al. . |
| 5,133,916 | 7/1992 | Sano et al. . |
| 5,229,057 | 7/1993 | Ohmory et al. . |
| 5,238,995 | 8/1993 | Fukunishi et al. . |
| 5,380,588 | 1/1995 | Nishiyama et al. . |
| 5,455,114 | 10/1995 | Ohmory et al. . |
| 5,486,418 | 1/1996 | Ohmory et al. . |

FOREIGN PATENT DOCUMENTS

| 47 31376 | 8/1972 | Japan . |
| 48 56925 | 8/1973 | Japan . |
| 49 10617 | 3/1974 | Japan . |
| 51 17609 | 6/1976 | Japan . |
| 1 357 817 | 6/1974 | United Kingdom . |
| 1 408 175 | 10/1975 | United Kingdom . |
| 1 468 920 | 3/1977 | United Kingdom . |
| 1 476 803 | 6/1977 | United Kingdom . |

OTHER PUBLICATIONS

Database WPI, Derwent Publications, AN 72–53194, JP–B–47 031 376.

Database WPI, Derwent Publications, AN 92–343321, JP–A–4 245 914, Sep. 1992.

Database WPI, Derwent Publications, AN 92–343320, JP–A–4 245 913, Sep. 2, 1992.

Database WPI, Derwent Publications, AN 75–34944, JP–B–51 017 609, Jun. 4, 1976.

*Primary Examiner*—Richard Weisberger
*Attorney, Agent, or Firm*—Oblon, Spivak, McClelland, Maier & Neustadt, P.C.

[57] ABSTRACT

By dissolving a vinyl alcohol polymer (A) and an incompatible vinyl polymer (B), preferably an acrylonitrile polymer in a common solvent to prepare a spinning stock solution of a phase separation structure wherein the polymer (B) is present at particle sizes of 2 to 50 μm, and wet spinning or dry-wet spinning the resulting spinning stock solution in a solidifying bath containing a mixture of an organic solvent capable of solidifying both the polymers (A) and (B) and the solvent of the spinning stock solution at a weight ratio of 25/75 to 85/15, thereby drawing the resulting yarn by 8-fold or more, a fiber is provided; and from the fiber can be produced a fibril with good hydrophilicity, a higher strength, and excellent heat fusion resistance, along with excellent wiping performance, filtering performance, microparticle capturing properties and reinforcing performance, readily, stably and inexpensively.

21 Claims, 2 Drawing Sheets

1 μm

1 μm

FIBRILLATABLE FIBER OF A SEA-ISLANDS STRUCTURE

BACKGROUND OF THE INVENTION

1. Field of the Invention

The present invention relates to a readily fibrillatable fiber comprising a vinyl alcohol polymer (abbreviated as "PVA" hereinafter) and a vinyl polymer different from the PVA, preferably an acrylonitrile polymer (abbreviated as "PAN" hereinbelow), characterized in that the fiber is readily modified into a super-fine fibril through the single action of chemically expanding force or mechanical stress or the combination thereof and is therefore preferable for use in wet-type or dry-type nonwoven fabric, friction material and reinforcing fiber for cement and rubber.

2. Description of the Prior Art

As the reinforcing fiber of a variety of friction materials for use in automobile brakes and clutch plates, conventionally, use has been made of asbestos, frequently, in terms of the trapping performance of inorganic microparticles, thermal resistance, heat fusion resistance, reinforcing properties and the like. However, the use of asbestos has been put under strict regulations because of concern that asbestos may be harmful for human health. In recent years, therefore, the fibril of costly aramide fiber has been selected as an alternative thereof. However, aramide fiber is so costly that it is also used in a limited fashion. Thus, materials with insufficient reinforcing performance, such as natural pulp, are used as a kind of filler in combination, but such filler materials deteriorate the performance of the resulting products. Hence, a readily fibrillatable fiber has been desired, which is less expensive than aramide fiber and which has fibrillating properties so as to procure particle trapping performance, heat fusion resistance and reinforcing properties in combination.

Because asbestos is now under very strict regulations from the reason described above also in the field of slate plate and the like where asbestos has been used for reinforcing cement, general-purpose fibers such as vinylon are therefore currently used as an alternative of asbestos. Because general-purpose fibers are of a larger size than the size of asbestos, the resulting reinforced slate has such a lower green strength that the slate should be mixed with the fibril of natural pulp. These thick fibers and natural pulp deteriorate the product performance. Thus, the development of a fibrillatable fiber of a greater strength has been demanded. For reinforcing rubber and the like, metha- or para-aramide fiber or vinylon has been used, but such fiber is also problematic in that the fiber should be treated with resorcin-formaldehyde-latex process so as to enhance the adhesivity. Hence, a readily fibrillatable fiber of a higher adhesivity, a larger specific surface area and a greater strength has been required.

For satisfying these demands, a great number of attempts have been made to apply the phase separation phenomenon of blend polymers to a method for producing a super-fine synthetic fiber. For example, Japanese Patent Publication 10617/1974, Japanese Patent Publication 17609/1976 and Japanese Patent Application Kokai (Laid-open) 56925/1973 describe individually that a fibril can be generated by beating a sea-islands fiber comprising PAN as the sea component and PVA graft-copolymerized with acrylonitrile or a poly (methyl methacrylate) polymer as the islands component.

According to the techniques described in these publications, however, a mixture of water and the solvent of a stock solution or a single organic solvent having the solidifying potency is used in a solidifying bath because PAN is the sea component. However, not any uniform gel yarn can be recovered from such techniques because of the strong solidifying action, involving difficulty in higher drawing. Hence, it is difficult to produce a fiber with excellent reinforcing performance and a higher strength, in a stable and inexpensive manner industrially.

Because the compatibility of the polymers is so enhanced with the addition of a graft polymer that the spinning solution turns transparent to hardly form a phase separation structure, not only fibrillation then gets hard but also the resulting fibril is too thin and so readily tangible, involving a problem in that a fiber ball may readily be formed.

Furthermore, Japanese Patent Publication 31376/1972 discloses a readily fibrillatable PVA fiber comprising a completely saponified PVA as the sea component and a partially saponified PVA as the islands component, but the fiber has drawbacks such that the partially saponified PVA is solubilized during the beating process in water so that a specific system or a specific chemical reagent will be needed so as to treat the water used for the beating; that an increased volume of foam may be generated during the beating, which disturbs the beating process; and that the beatability of the fiber is not essentially satisfactory because the sea component and the islands component both comprise PVA polymers.

SUMMARY OF THE INVENTION

Therefore, a fiber principally comprising PVA, having a higher strength, being readily fibrillatable and highly dispersible and having a sufficient reinforcing effect, has been demanded, but such fiber has not been generated yet. In such circumstances, the present inventors have energetic investigations to find out a readily fibrillatable fiber satisfying the desirable performance described above.

More specifically, the present invention is to provide a readily fibrillatable fiber of a sea-islands cross section, comprising PVA (A) and a vinyl polymer (B) different from the PVA, wherein the components (A) and (B) serve as the sea component and the islands component, respectively, characterized in that the fiber has a strength of 6 g/d or more and a beatability of 30 minutes or less. Such readily fibrillatable fiber can be produced by dissolving PVA (A) and the polymer (B) in an organic solvent to prepare a spinning solution, wet spinning or dry-wet spinning the resulting spinning solution into a solidifying bath of a mixture of a solidifying solvent having the solidifying potency of the two polymers and the organic solvent of the spinning solution, removing the organic solvent of the spinning solution from the fiber in an extraction bath, and drawing the resulting yarn, provided that the following conditions 1 to 3 should be met;

1. the spinning solution is of a phase separation structure in which particles of a particle size of 2 to 50 μm, comprising the solution of the polymer (B), are present in the solution of the polymer (A);
2. the solidifying solvent is an organic solvent and the solidifying bath includes the organic solvent of the spinning solution at 15 to 75% by weight; and
3. the total draw ratio is 8 or more.

DETAILED DESCRIPTION OF THE PREFERRED EMBODIMENTS

Figure 1:
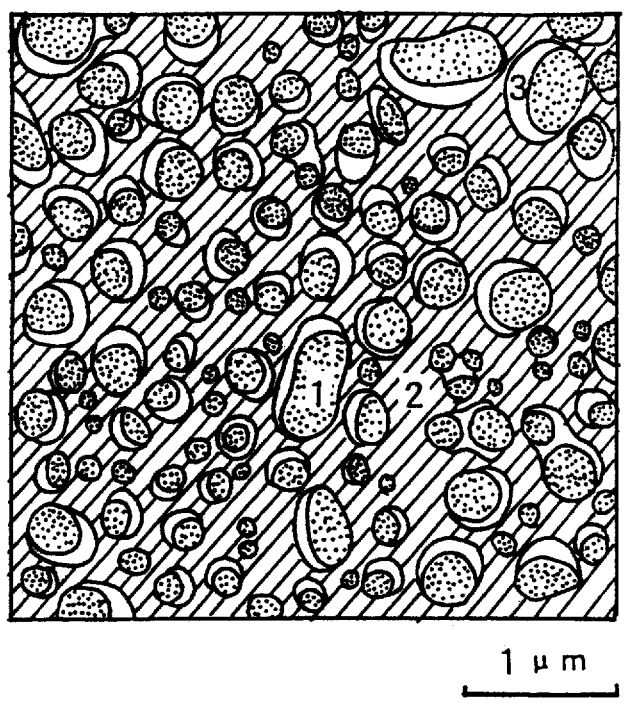
FIGS. 1 and 2 depict examples illustrative of the cross section of the fiber of the present invention, wherein the dotted island parts (parts marked with a numerical FIG. "1" in the figure) are composed of the polymer (B) while the slashed sea part (part marked with a numerical FIG. "2" in the figure) is composed of PVA (A), and blank parts present in the boundaries between the PVA (A) and the polymer (B) (parts marked with a numerical FIG. "3") are void parts.

The fiber of the present invention is a fiber of a sea-islands cross section, substantially comprising PVA (A) and a vinyl polymer (B) different from the PVA (A), wherein the component (A) is the sea component and the component (B) is the islands component. Particularly when a PAN polymer is used as the polymer (B), a fiber with a particularly high strength can be produced because PVA and PAN both have highly polar groups. The fiber is excellent as a reinforcing material because the fiber has a higher adhesivity to cement, rubber and the like and a higher thermal resistance; additionally, the fiber has so high hydrophilicity that the fiber is preferable for use in wiper materials of which wiping performance is significant.

In accordance with the present invention, the term "PVA (A)" means a polymer containing the vinyl alcohol unit at 70 mole % or more, and the polymer may therefore be copolymerized with monomers at a ratio of less than 30 mole %, satisfactorily, such as ethylene, vinyl acetate, itaconic acid, vinyl amine, acrylamide, vinyl pivalate, maleic anhydride, and a vinyl compound containing sulfonic acid. Preferably, such polymer has a saponification degree of 80 mole % or more, and for orientation and crystallization, preferably, the polymer contains the vinyl alcohol unit at 95 mole % or more, more preferably 98 mole % or more, still more preferably 99 mole % or more and most preferably 99.8 mole % or more. The polymerization degree of PVA is not with specific limitation, but is preferably 500 or more, more preferably 1500 or more, so as to produce a fibril of a higher strength. So as to improve the hot-water resistance, PVA may be acetalated and cross linked within the molecules or between the molecules with formaldehyde, glutaraldehyde and the like, at a post-reaction after such fiber preparation. Additionally, PVA may be cross linked with other crosslinking agents, besides those described above.

In accordance with the present invention, use is made of a vinyl polymer (B) different from the PVA (A) as the islands component, because the vinyl polymer readily forms a spinning solution of a good phase separation structure when mixed with the PVA (A) in an solvent. Furthermore, the polymer (B) is preferably a vinyl polymer with no water swelling and substantially never containing any vinyl alcohol unit, because such polymer is readily fibrillated in combination with PVA (A). The term "polymer with no water swelling" means a polymer with a water absorption ratio below 20% by weight, when a 100 μm-thick nonporous film prepared from the polymer is immersed in water at 20° C. to absorb water up to its saturation state. In accordance with the present invention, PAN is illustrated as the most preferable example of the polymer (B) as described above; and another preferable example includes a methyl methacrylate polymer (abbreviated as "PMMA" hereinafter).

The PAN in accordance with the present invention should satisfactorily contain the acrylonitrile unit at 70 mole % or more, and thus, the PAN may be copolymerized with monomers at a ratio of less than 30 mole %, satisfactorily, such as (metha)acrylate esters for example methyl acrylate, ethyl acrylate, and methyl methacrylate; vinyl esters for example vinyl acetate and vinyl lactate; vinyl compounds for example vinyl chloride; unsaturated carboxylic acids for example acrylic acid, methacrylic acid, and maleic anhydride; and vinyl compounds containing sulfonic acid. So as to improve the solubility in the solvent of the spinning solution, preference is given to a PAN copolymer with other vinyl monomers copolymerized therein at a ratio of 0.5 to 10 mole %, more preferably 2 to 8 mole %, rather than PAN homopolymer.

Furthermore, the PMMA should satisfactorily contain the methyl methacrylate unit at 80 mole % or more, and therefore, the PMMA may be copolymerized with for example methyl acrylate and ethyl acrylate within a range up to 20 mole %. Preferably, in particular, the PMMA to be used in accordance with the present invention is copolymerized with methyl acrylate at 2 to 20 mole %, because such PMMA may readily form a solution of the sea-islands phase separation structure as described below; and from the same reason, the PMMA is preferably at a polymerization degree of 300 to 2,000.

In accordance with the present invention as has been described insofar, PVA should be the sea component while the polymer (B) should be the islands component, and the weight ratio of A/B therefor should be 80/20 to 42/58, preferably. When PVA (A) is below 42% by weight, the PVA (A) and the polymer (B) both are so highly solubilized into the solidifying bath that inter-fiber fusion is readily induced and not any well-defined phase separation state with the PVA (A) as the sea component can be prepared. When PVA (A) is above 80% by weight, the number of the islands component becomes small and therefore the fibrillation becomes difficult. From the respect of strength, the fibrillation of a recovered fiber and the dispersibility of a yielded fibril, in particular, the (A)/(B) ratio in weight should preferably be 70/30 to 50/50.

The fiber of the present invention should have a strength of 6 g/d or more. The term "strength" in accordance with the present invention means the tensile strength measured according to JIS-L 1015. If the strength is less than 6 g/d, then, the reinforcing performance for cement, rubbers and resins is insufficient. In accordance with the present invention, the strength should be preferably 7 g/d or more, and particularly preferably 8 g/d or more.

The beatability of the fiber of the present invention should be 30 minutes or less. The term "beatability" in accordance with the present invention refers to the duration of agitation and beating as measured as follows; leaving to stand a fiber sample (4 g) in atmosphere at 20° C. and a relative humidity of 65%, cutting the sample into 2-mm pieces, adding water (400 cc) at 20° C. into the cut sample and charging the sample in a mixer manufactured by Matsushita Electric Industry, Co. Ltd. (National MX-X40) prior to agitation and beating at 11,000 rpm for a given period of time, subsequently sampling the beaten solution in water dispersion and measuring the filtered water time by the method described below, the duration of agitation and beating required for the filtered water time to reach 60 seconds is referred to as beatability. The term "filtered water time" in accordance with the present invention means a time required for filtering a water dispersion (750 cc) containing a fibril of 0.5 g through a 350-mesh metal filter mounted on the open-bottom part of an open-bottom measuring cylinder of a diameter of 63 mm.

The beatability above 30 minutes is so insufficient that the fiber is never fibrillated sometimes when used practically. A longer duration of beating may lead to poor dispersibility of the resulting fibril, which consequently tends to form fiber balls. It is needless to say that even a fiber with poor fibrillatability may possibly be fibrillated by methods such as the prolongation of the duration of beating or the application of more severe beating conditions, but the fibril produced in such manner is at a state such that fibrils have tangled to each other or fibrils have been cut further in shorter pieces, so such fibril is not suitable for the intended use. The reason why such longer duration of beating generally deteriorates the fibril dispersibility is not evident, but it is possibly due to the fact that such fibril is so thin to be readily tangible. The presence or absence of the formation of fiber balls is determined as follows. Placing a beating solution (40 cc) in a 300-cc beaker, subsequently adding a viscous agent (aqueous 0.1% polyethylene oxide solution) and water to the solution to a final solution volume of 200 cc, and sufficiently agitating the resulting solution by means of a glass bar, fibrils tangling to each other or fibrils tangling to the fibers, in this dispersion, may form fiber balls of a diameter of 3 mm or more, which cannot be disintegrated with an agitation procedure alone with a glass bar. The presence or absence of the fiber balls should be determined under observation.

Characteristically, the fiber of the present invention hardly forms fiber balls. The reason is not essentially evident, but may potentially reside in the use of an organic solvent in the solidifying bath.

The fiber of the present invention preferably has a filtered water time of 75 seconds or more after 5-minute beating. Such fiber can be produced by the processes described below. The term "filtered water time after 5-minute beating" (simply referred to sometimes as "filtered water time" hereinbelow) means a time required for passing a water dispersion (750 cc) containing a fibril of 0.5 g through the aforementioned measuring cylinder with a metal filter mounted on the open-bottom part, after 5-minute beating under the same conditions as those for measuring the beatability as described above.

In the cross section of the fiber of the present invention, furthermore, voids may preferably be present on the periphery of a part or most part of the island components of a diameter larger than 0.2 $\mu$m. As described above, FIG. 1 depicts one example of the cross section of the fiber in accordance with the present invention on the basis of the microscopic pictures, wherein dotted island parts correspond to the polymer (B), while the slashed sea part corresponds to the PVA (A), and the blank parts present in the boundaries between the PVA (A) and the polymer (B) correspond to the void parts described above. Via the presence of such void parts in the fiber of the present invention, the beatability of the fiber is enhanced far greatly. If the polymer (B) is PAN, in particular, the number of islands with a void increases. When a spinning solution does not have a phase separation structure, such void does not develop. The void may possibly be generated during the extraction of the solvent from the spinning solution for wet spinning or dry-jet wet spinning and during the dry process, but such void substantially is not generated at processes for melt spinning or dry-type spinning.

Figure 2:
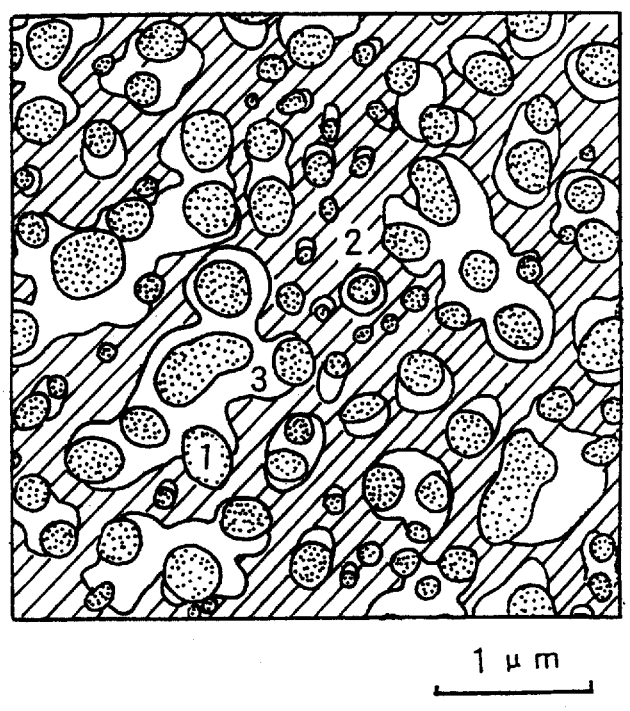

Based on the microscopic pictures, FIG. 2 depicts one example of the cross section of a fiber with a filtered water time of 75 seconds or more, produced by a method described below. The area of void parts present in between the islands and the sea, in FIG. 2, is larger than the area in FIG. 1. A part of islands of an average diameter larger than 0.4 $\mu$m have voids in common to adjacent islands. These larger common voids more readily induce further fibrillation. The term "average diameter" of an island means the diameter of a circle corresponding to the cross sectional area of the island.

Description will now be made of a method for producing the fiber of the present invention. Firstly, PVA (A) and the polymer (B) are dissolved in an organic solvent to prepare a spinning solution. Such organic solvent includes polar organic solvents, for example, dimethyl sulfoxide (DMSO), dimethylacetamide and dimethylformamide. From the respect of properties of low-temperature dissolution, low decomposition of the polymers, and ready fibrillation, preference is given to DMSO. The total polymer concentration of the PVA (A) and the polymer (B) in the spinning solution is preferably within a range of 10 to 30% by weight. Furthermore, the temperature of the spinning solution is preferably within a range of 50° to 120° C.

The spinning solution produced by the method of the present invention should be of a phase separation structure at particle sizes of 2 to 50 $\mu$m. The term "phase separation structure" of the spinning stock solution in accordance with the present invention refers to a state with observed particles, when the spinning solution is dropwise added onto a slide glass to a final thickness of about 200 $\mu$m to photograph the solution by a differential interference microscope Type BX-60 manufactured by Olympus Optical Co. Ltd. From the respect of strength and high modulus and additionally from the respect of ready fibrillation in accordance with the present invention, PVA (A) and the polymer (B) should be present in a phase separation state wherein the polymer (B) is the dispersed component (islands component) and the component PVA (A) is the component functioning as the dispersing medium. The term "particle sizes of 2 to 50 $\mu$m" in accordance with the present invention means that most of particles identified by the differential interference microscope have diameters within the range. Most of particle sizes, if above 50 $\mu$m, are not preferable in terms of the stability of the stock solution and the spinning stability; most of particle sizes, if below 2 $\mu$m, are neither preferable because the phase separation is so insufficient that the beatability of the resulting fiber is deteriorated. A phase separation structure at particle sizes of 3 to 45 $\mu$m is more preferable. Because the particles in the spinning solution serve as nuclei during solidification, the particle size is significant for forming a readily fibrillatable fiber.

The particle size in the spinning solution may be measured by the following method, in addition to the method described above. More specifically, coating the spinning solution onto a slide glass to a final thickness of about 100 $\mu$m and solidifying the solution with methanol at room temperature to prepare a film which is to be observed with an optical microscope of 500 magnifications, the diameter of a particle then identified should be measured and defined as the particle size (the method is referred to as "particle size by the methanol solidification method" hereinafter). In accordance with the present invention, most of particles identified by the method of methanol solidification have diameters within a range of 1 to 20 $\mu$m, which range corresponds to the sizes of 2 to 50 $\mu$m, identified by the differential interference microscope. Further, the term "particle size" simply referred to in accordance with the present invention means a value measured by means of the differential interference microscope.

The factors determining the phase structure of the spinning solution include the compatibility of the two polymers, namely PVA (A) and the polymer (B), the composition ratio of the two polymers, the conditions for agitating the spinning solution, and the like. With respect to the compatibility of the two polymers, poorer compatibility thereof (meaning a lower compatibility) involves a larger particle size; with respect to the composition ratio, meanwhile, a polymer at a larger ratio serves generally as the sea component. In addition to these factors, a significant factor determining the particle size is the agitation conditions during the dissolution. Generally, preference is given to the agitation conditions to a peripheral speed of 1 to 10 m/sec, although the conditions agitator ore or less, depending on the type of an agitator or the shape of an agitation wing. Above 10 m/sec, the particle size gets too small; less than 1 m/sec, alternatively, the dissolution or dispersed state of the polymers is insufficient, unpreferably. The peripheral speed of 2 to 5 m/sec is particularly preferable. The particle state is essentially determined by a combination of the polymers, and so as to prepare a desirable particle size from the combination, the composition ratio of the two polymers, the polymer concentrations, the additives in the spinning solution, the dissolution rates and agitation rate should be adjusted appropriately. For simplification, in particular, the peripheral agitation speed should be selected within a range of 1 to 10 m/sec, to prepare a spinning solution of which particle size is then measured. Based on the results, the agitation conditions should be modified to adjust the particle size.

By adjusting the particle size within a range of 2 to 50 μm in such manner and selecting the conditions for a solidifying bath and those for drawing as described below, the processability such as spinnability and drawing performance can be established in combination with the properties such as ready fibrillatability and strength. The viscosity of the spinning solution is preferably within a range of 10 to 400 poises for wet spinning or within a range of 50 to 2,000 poises for dry-jet wet spinning.

The spinning solution thus produced is then passed through a spinning nozzle for wet spinning or dry-jet wet spinning in a solidifying bath. Because the wet spinning process comprising directly contacting the solidifying bath to the spinning nozzle can spin without fibrous fusion even if the pitch of the nozzle orifices is narrowed, so that the process is suitable for spinning by means of a multi-orifice nozzle. Alternatively, a dry-jet wet spinning where an air gap is arranged between the solidifying bath and the spinning nozzle is suitable for high-speed spinning because of a larger drawing at the air gap part. In accordance with the present invention, the wet-type process or dry-jet wet process may be appropriately selected, depending on the object and use.

In accordance with the present invention, an organic solvent is used as the solidifying solvent in the solidifying bath, along with a mixture solution of the solidifying solvent and the solvent of the spinning solution at a ratio of 25/75 to 85/15. So as to produce the fiber of the present invention, it is significant to use as the solidifying solvent an organic solvent having a potency of solidifying both the PVA (A) and the polymer (B) and compatibility with the solvent of the spinning solution, such as alcohols for example methanol and ethanol, and ketones for example acetone and methyl ethyl ketone. Conventionally known PVA/PAN fibril fibers mostly contain PAN as the principal component, and in this case, water having a greater solidification potency of PAN is used in the solidifying bath industrially. Although water does not have any solidifying potency of PVA but has distinctly different solidifying potency of the two polymers with no balance, organic solvents have solidifying potencies of any of the polymers and can solidify the polymers in a balanced manner when mixed with the solvent of the spinning solution, which gives preferable influences over the performance of the readily fibrillatable fiber.

So as to maintain an appropriate solidification level by the method in accordance with the present invention, the composition ratio of a solidifying organic solvent in the solidifying bath and the solvent of the spinning solution is of importance; in accordance with the present invention, a range of 25/75 to 85/15 in weight ratio is selected. If the level of the solvent of the spinning solution in the solidifying bath is less than 15%, the solidifying potency is too high, which causes break at the nozzle and poor spinning tone. Additionally, the fiber performance represented by the strength of the resulting fiber is likely to be deteriorated. If the concentration of the solvent of the spinning solution in the solidifying bath is more than 75%, no satisfactory solidification can be induced, involving the deterioration of the spinning processability. Thus, not any fiber with satisfactory performance from the respect of strength can be produced. More preferably, the concentration of the solvent in the spinning solution in the solidifying bath was within a range of 20 to 70% by weight; most preferably, the level is within a range of 30 to 65% by weight. As has been described above in accordance with the present invention, a mixture solution of an organic solidifying solvent and the solvent of the spinning solution is used in the solidifying bath, but it is needless to say that smaller amounts of liquids or solids, besides them, may be dissolved and present in the solidifying bath. In accordance with the present invention, the most preferable combination of the solidifying solvent and the solvent of the spinning solution is a combination of methanol and DMSO.

The gel yarn passing through the solidifying bath is transferred to processes of wet drawing, extraction of the solvent of the spinning solution, addition of an oiling agent, drying and the like, prior to the transfer to dry heat drawing process. For leading the yarn formed in the solidifying bath into an extraction bath to remove the spinning solution contained in the yarn, furthermore, use of a final extraction bath comprising three components of alcohols, ketones and water with a weight ratio of the alcohols and ketones at 9/1 to 1/9 and a water content at 1 to 30% by weight of the total weight of the three components, can yield a very excellent, readily fibrillatable fiber, satisfying the required performance of a filtered water time of 75 seconds or more. The alcohols in the final extraction bath include for example methanol, ethanol, propanol and butanol. Also, such ketones include for example methyl isopropyl ketone, methyl-n-butyl ketone, and methyl isobutyl ketone; ketones having a higher boiling point than that of water, for example methyl-n-butyl ketone and methyl isobutyl ketone, are preferable from the respect of generating more excellent, ready fibrillatability. If the weight ratio of the alcohols and the ketones is outside the range of 9/1 to 1/9, the resulting beatability may not be very excellent. If the water content is less than 1% by weight, the beatability is neither very excellent; if above 30% by weight, the fibers fuse to each other, causing the deterioration of the strength and the like of the fibers. By using such final extraction bath composed of the specific three components, a fiber satisfying the condition such that the filtered water time should be 75 seconds or more as described above can be produced, and the cross section of the resulting fiber is such that a part of islands of an average diameter larger than 0.4 μm have voids in common to adjacent islands, as shown in FIG. 2.

The thus produced spun yarn is dried and subsequently drawn by dry heating. The dry heat drawing process is significant for the method of the present invention; more specifically, the dry heat drawing should be done to a final total draw ratio of 8 or more. The term "total draw ratio"

means a magnification represented by a wet draw ratio multiplied by a dry heat draw ratio, and when the total draw ratio is less than 8, neither a fiber with a greater strength nor a readily fibrillatable fiber can be generated.

The factors to make the total draw ratio above 8 include the PVA (A) /polymer (B) composition ratio, the conditions of the solidifying bath such as the composition and temperature of the solidifying bath, and wet drawing conditions such as wet draw ratio, dry heat drawing conditions such as dry heat drawing temperature and residence time (drawing rate) in dry heat drawing atmosphere. With respect to the composition ratio of PVA(A)/polymer (B), a higher PVA(A) volume ratio can enhance the total draw ratio; an increased ratio of the solvent of the spinning solution in the solidifying bath can lower the total draw ratio; or a higher temperature of the solidifying bath can increase the total draw ratio. In accordance with the present invention, furthermore, the temperature of the solidifying bath is preferably within a range of −5° to 20° C. Additionally, a larger wet draw ratio tends to induce the increase of the total draw ratio; a higher dry heat drawing temperature increases the total draw ratio; or a longer residence time in drawing atmosphere furthermore elevates the total draw ratio. In accordance with the method of the present invention, still furthermore, the wet draw ratio, the dry heat drawing temperature and the residence time should preferably be within ranges of 1.5- to 4.5-fold, 210° to 250° C. and 5 to 90 seconds, respectively. So as to generate the total draw ratio at a desirable value, thus, spinning and drawing firstly be conducted under appropriate conditions; and then, at least one of the factors should be modified on the basis of the resulting total draw ratio, to readily change the total draw ratio to the desirable value.

For the method of the present invention, the total draw ratio should be preferably 10 or more, more preferably 12 or more. The fiber after dry heat drawing may satisfactorily be treated with dry heating, shrinkage process, and further, with formal process so as to improve the hot-water resistance, and acetal process via dialdehyde and the like, and cross-linking process via long-chain alkyl phosphate and the like.

Within the scope of the objects of the present invention, still additionally, the fiber of the present invention may or may not contain an inorganic pigment, an organic pigment, a thermal deterioration preventive agent, a pH adjusting agent, a cross-linking agent, an oiling agent, a variety of stabilizers and the like, in addition to the PVA(A) and the polymer (B), which may be added at individual production stages, such as the stage of the spinning solution, the solidifying stage, the extraction stage, immediately before drying, before heat drawing, after heat drawing and after post-reaction.

As has been described above, the fiber thus produced contains such islands with voids in the boundaries between PVA (A) and the polymer (B) that a fibril of a size of about 1 $\mu$m can be readily produced through the single application of chemical expanding force or mechanical stress or the combined application thereof. Fibrillation methods representatively include a method comprising fibrillating a fiber and forming the resulting fibril into a sheet form; a method comprising forming a fiber into a sheet form prior to fibrillation; and a method comprising mixing a fiber into rubber, cement and plastics and fibrillating the fiber during kneading.

Herein, a first method comprises cutting the fiber of the present invention into short pieces of 1 to 30 mm, immersing and dispersing the pieces into water, fibrillating the pieces through mechanical stress by means of beater, refiner, mixer and the like, and making paper from the resulting fibril as a paper material. The sheet produced by the method is in the form of a fine fiber due to fibrillation, so that a thin and strong paper of a higher tension can be produced. When a fibril is mixed with inorganic micro-particles or micro-particles of a thermo-setting resin under agitation, such particles can be captured into the fibril to be then fabricated, thus generating a friction material suitable for brake shoe and clutch plate.

A second method comprises crimping and cutting the fiber of the present invention into a staple, subsequently passing the staple through a carding machine to form a web, and applying a high-pressure water jet of 30 kg/cm$^2$ or more, preferably 60 kg/cm$^2$ or more onto the web, thereby fibrillating the fiber of the present invention via the impact or shear of the high-pressure water jet; or the method may comprise cutting the fiber of the present invention into pieces of 1 to 30 mm, dispersing the pieces as a paper material in water to prepare a base paper by wet process, and applying a high-pressure water jet of 30 kg/cm$^2$ or more, preferably 60 kg/cm$^2$ or more onto the paper, thereby fibrillating the fiber of the present invention via the impact or shear of the high-pressure water jet. Because of the fibrillation with a high-pressure water jet after web formation, the method is advantageous in that poor dispersion or high density due to fibril can be avoided to produce a porous, soft, two-dimensional sheet although the sheet comprises a super-fine fiber. The sheet is useful as wiper and filter.

Furthermore, a third method comprises fibrillating a fiber by applying shear force to the fiber added during rubber mastication, the agitation of cement slurry or the melt kneading of plastics, and therefore, the method is superior in that no specific process is needed to fibrillate the fiber. Hence, the method is suitable for producing fiber-reinforced rubber products, fiber-reinforced cement products and fiber-reinforced plastics products.

Fibrillation of fibers via high-pressure water jet has been carried out conventionally, but the processability prior to such high-pressure water jet process and fibrillation have not been compatible to each other because they are in reverse correlation. More specifically, a fiber readily fibrillatable at a high-pressure water jet process is so readily fibrillated at processes of spinning, drawing, crimping and carding, to cause a trouble in the processing. Adversely, a staple with lower fibrillation, with no trouble in the processability prior to the web formation process, is hardly fibrillated at the high-pressure water-jet process, so that a nonwoven fabric comprising a super-fine fiber tends to be hardly produced. As has been described above, however, the fiber of the present invention has lower fibrillation at its dry state prior to the high-pressure water jet process. Therefore, the trouble due to fibrillation may be less at the dry process; and at its wet state with high-pressure water jet, the inner deformation is enlarged so instantly through the expansion of PVA (A) constructing the fiber, that fibrillation is readily induced in the fiber via high-pressure water jet.

Because the fiber of the present invention is also fibrillatable through a strong, mechanical shear force alone, a needle punch method is additionally used as one of the fibrillation methods. As has been described above, herein, the fiber of the present invention is far more fibrillated with a mechanical shear force at its state with wet deformation, as is the case of water-jet process. Thus, the needle punch method without wet deformation should be conditioned strictly. In other words, the fibrillation should be carried out under the conditions of a punching density of preferably 250 needles/cm$^2$ or more, and more preferably 400 needles /cm$^2$ or more.

For both of such dry water-jet method and needle punch method, generally known any process may be satisfactory, for example, carding processes such as roller card, semi-random card, and random card, and web formation processes such as tandem web, cross web, and crisscross web.

Papers produced by generally known paper making machines of cylinderer paper machine, foudrinier paper machine and the like, may be satisfactory as the paper to be used by the wet water-jet method; any paper at a dry state or at a state prior to drying may be satisfactory, if the paper can be introduced into a water-jet process.

As the raw material to be mixed into a web or into a paper, together with the fiber of the present invention, use is made of generally known materials including natural pulp, synthetic pulp, cotton, linen, rayon, solvent-spun cellulose fiber, polynosic rayon, acetate fiber, polyester fiber, acryl fiber, nylon fiber, polypropylene fiber, vinylon and the like. As to the web lamination, webs of different mixing ratios of the fiber of the present invention may satisfactorily be laminated together or a web of the fiber of the present invention may satisfactorily be laminated to a web with no containment of the fiber of the present invention. In other words, the fiber of the present invention may partially be contained in a web at its fibrillated state, satisfactorily. Therefore, the fiber may be present not uniformly but unevenly, satisfactorily. To the resulting dry-type nonwoven fabric, wet-type nonwoven fabric, or needle punch dry-type nonwoven fabric may be added generally known resin binders such as vinyl acetate-, acrylic-, polyethylene-, vinyl chloride-, urethane-, polyester-, epoxy-, rubber binders by the emulsion binder imparting method and powder imparting method, including saturation method, spraying method, printing method, and foaming method.

The present invention will now be described more specifically in examples, but the present invention is not limited to these examples.

EXAMPLE 1

PVA of a polymerization degree of 1,750 and a saponification degree of 99.8 mole % and PAN (of a water absorption ratio of 5% or less) copolymerized with methyl methacrylate at 5 mole % were dissolved in DMSO under agitation at a peripheral speed of 3 m/sec at 100° C. in nitrogen stream by means of an agitator having an inclined puddle wing for 8 hours, to produce a mixture spinning solution of a weight ratio of PVA/PAN of 50/50 and a polymer concentration of 20% by weight. The spinning solution was opaque under visual observation; under the observation of the phase structure by the differential interference microscope described above, the structure was mostly in phase separation at particle sizes of 2 to 50 $\mu$m, while the particle sizes measured by the methanol solidification method were within a range of 3 to 10 $\mu$m. Coating the spinning solution on a glass plate to a final thickness of about 200$\mu$m and immersing the plate as it was in methanol at room temperature, followed by hot water process, it was confirmed that the PVA component was the component of the dispersing medium (sea component) while the PAN component was the dispersed component (islands component). The spinning solution was left to stand for defoaming for 8 hours, but it was verified that no tendency was observed that the dispersed particles would aggregate to grow into a larger particle and that the solution had an absolutely stable phase structure.

Passing the spinning stock solution at 80° C. through a spinning nozzle of 1,000 orifices of a diameter of 0.08 mm to wet spin the solution in a solidifying bath of a DMSO/methanol weight ratio of 50/50 and a temperature of 10° C., subjecting to wet drawing of 3-fold, extracting the DMSO contained in the yarn into methanol, drying the resulting yarn in hot air at 80° C., prior to dry heat drawing at 230° C. to a total draw ratio of 18 (the residence time in the dry heat drawing bath was 30 seconds), a PVA/PAN blend fiber of a total 1,800 denier and 1,000 filaments was produced. The microscopic examination of the cross section of the fiber indicates that the PVA corresponded to the sea while the PAN corresponded to the islands and that voids were present in at least part of the boundaries between a part of the island components of a diameter larger than 0.2 $\mu$m and the sea component. The fiber had a strength of 8.5 g/d and a Young's modulus of 180 g/d. The fiber was then cut into pieces of a length of 2 mm, which were dispersed in water, followed by beating by means of the mixer for 5 minutes. The resulting beaten solution was observed with an optical microscope. Most of the fibers were fibrillated into a fibril of a size of about 1 $\mu$m. Further, the filtered water time of the beaten solution after the 5-min beating was measured to be 70 seconds. The fiber beatability defined by the present invention was within 5 minutes. The dispersibility of the beaten solution was excellent, with no observed fiber ball derived from the tangle of fibrils to each other. By cutting the fiber of the present Example into pieces of a length of 3 mm, and beating the pieces by means of a refiner followed by paper making, a paper of a higher density and a higher strength was produced.

Crimping the fiber produced in the Example and cutting the resulting fiber into 51-mm pieces to produce a staple, carding the staple to prepare a card web, the card web was then subjected to a high-pressure water jet process at 80 kg/cm2. Scanning electron microscopic observation of the surface of the resulting nonwoven fiber indicated that most of the fibers were fibrillated into a fibril of a size of about 1 $\mu$m. Using the nonwoven fabric to wipe the stain of a pair of glasses, the stain was very cleanly wiped off. No problem developed even after washing the nonwoven fabric in water, so the fabric could be used as a wiper in a repeated fashion.

Furthermore, the PVA/PAN blend fiber was added to natural rubber followed by kneading. Through the shear force during the kneading, the fiber was fibrillated in the form of dispersion in the rubber. The rubber composition was molded into a sheet of a thickness of 2 mm, which was shown to be an extremely strong sheet in the fibril length direction.

Comparative Examples 1 and 2

Fibers were produced under almost the same conditions as in Example 1, except that the weight ratios of PVA/PAN were 9/1 (in Comparative Example 1) and 1/9 (Comparative Example 2). In Comparative Example 1, the DMSO concentration in the solidifying bath was decreased from 50% to 30%, whereby smooth spinning was achieved, with drawing at a total draw ratio of 15. The resulting fiber of Comparative Example 1 had a strength of 12.5 and a Young's modulus of 230 g/d. However, the fiber was so poorly beatable that the fiber was hardly fibrillated after agitation and beating for 60 minutes. Comparative Example 2 showed poor spinnability and poor drawability, with no normal fiber produced.

Comparative Example 3

A fiber was produced under almost the same conditions as in Example 1, except that the dry heat draw ratio was modified to a final total draw ratio of 6, provided that the discharge flow was adjusted so that the single yarn fineness might be the same as in Example 1. The resulting fiber had a lower strength of 4.1 g/d and a lower Young's modulus of 89 g/d than those of Example 1. Compared with the beatability of Example 1, the beatability of the fiber was poor, but it was substantially as good as 15 to 20 minutes. From the respect of rubber reinforcement, however, the fiber had far poorer than that of Example 1, which was demonstrated as the lower Young's modulus of the fiber-reinforced rubber.

EXAMPLE 2

A spinning solution was prepared in the same manner as in Example 1, except that the PVA/PAN weight ratio was modified into 60/40 and the peripheral speed of an agitator was 5 m/sec. The spinning solution was opaque under visual observation; under observation of the phase structure by the method described above, a phase separation structure containing particles most of which had particle sizes within a range of 2 to 50 $\mu$m was formed; and the particle sizes measured by the methanol solidification method were within a range of 2 to 8 $\mu$m. It was verified by the same hot water process after film preparation as in Example 1, that PVA was the dispersing medium component (sea component) and the PAN component was the dispersed component (islands component) in the spinning solution. The spinning solution was left to stand for 8 hours for defoaming, but no tendency was observed such that dispersed particles would aggregate to form a larger particle. It was thus confirmed that the spinning solution formed an absolutely stable phase structure. The spinning solution of 80° C. was wet spun into the solidifying bath of a DMSO/methanol of 45/55 at a temperature of 5° C., through a spinning nozzle of 1,000 orifices of a diameter of 0.08 mm, wet drawn of 3-folds, followed by extraction of the DMSO contained in the yarn into methanol and drying in hot air at 80° C. Subsequently, the resulting yarn was subjected to dry heat drawing at 230° C. to a final total draw ratio of 16 (the residence time in the drawing bath was 30 seconds), to produce a PVA/PAN blend fiber of 1,800 d/ 1,000 f.

As shown in FIG. 1, the observation of the cross section of the fiber demonstrated that PVA corresponded to the sea while PAN corresponded to islands, and most of islands of a diameter larger than 0.2 $\mu$m had voids in at least part of the boundaries with the sea component. The fiber had a strength of 9.5 g/d and a Young's modulus of 210 g/d. The beatability of the fiber was 10 minutes while the filtered water time after 5-min beating was 20 seconds, never involving the formation of any fiber ball. Adding the fiber to rubber as in Example 1 for mastication and molding the resulting mixture into sheet, a sheet of a very high strength was yielded as in Example 1.

Comparative Examples 4 and 5

The DMSO concentration in the solidifying bath in Example 1 was modified to 10% by weight (Comparative Example 4), with the resultant frequent yarn break at the nozzle part. The resulting fiber had a beatability above 30 minutes, while the filtered water time after 5-min beating was 4 seconds or less. Thus, it was difficult to fibrillate the fiber. The DMSO concentration modified to 80% by weight (Comparative Example 5) caused the deterioration of the solidification and spinnability, so no normal spun base yarn could be produced.

Comparative Example 6

In the same manner as in Example 2, PVA-grafted PAN (radically polymerized acrylonitrile in the presence of PVA, having a grafting ratio of 75%) was mixed with PVA at a grafted PAN/PVA weight ratio of 40/60 prior to dissolution. The spinning solution thus produced was transparent and homogeneous with no sea-islands phase structure observed with a differential interference microscope. In the same manner as in Example 2, the spinning solution was spun and drawn. The spinning and drawing tones were smooth. The resulting fiber of a strength of 9 g/d and a Young's modulus of 200 g/d was as good as the fiber of Example 2, but the fiber was hardly beatable, as shown in the beatability of 50 minutes or more and the filtered water time after 5-min beating of 4 seconds or less. The PVA-grafted PAN showed good compatibility with PVA, never forming a phase separation structure at the stage of the spinning solution. Because the PAN was too uniformly dispersed finely at a state close to molecular dispersion in the fiber, it was concluded that the fiber was thus hardly fibrillatable.

EXAMPLE 3

The dissolution and spinning of the spinning solution was conducted as in Example 1, except that use was made of poly(methyl methacrylate) having been copolymerized with methyl acrylate at a ratio of 10 mole % and having a polymerization degree of 1,000 (Parapet G-1,000; manufactured by KURARAY CO., LTD.; a water absorption ratio of 2%; abbreviated as "PUMA" hereinafter) in place of PAN and that the weight ratio of PVA/PMMA was 60:40. The resulting spinning solution was opaque; and under observation with a differential interference microscope, the solution was of a phase separation structure wherein most of the particles were within a particle size range of 2 to 50 $\mu$m, while the particle sizes measured by the methanol solidification method were within a range of 2 to 10 $\mu$m. The observation of the resulting spinning solution in the same way as in Example 1 demonstrated that the solution was of a sea-islands structure wherein PVA was the sea component.

Furthermore, the observation of the cross section of the resulting fiber indicated that PVA corresponded to the sea while PMMA corresponded to the islands; that distinct but narrower voids than those in Examples 1 and 2 were present in a part of the boundaries with the sea component on the periphery of a part of islands of a diameter larger than 0.2 $\mu$m in between the sea component and the island components; and the fiber had a strength of 8.7 g/d and a Young's modulus of 190 g/d. The beatability of the resulting fiber was 10 minutes, while the filtered water time after 5-min beating was 15 seconds. No fiber ball formation was observed.

EXAMPLE 4

PVA of a polymerization degree of 1,750 and a saponification degree of 99.8 mole % and PAN (a water absorption ratio of 10% or less) copolymerized with vinyl acetate at a ratio of 5 mole % were dissolved in DMSO under agitation at a peripheral speed of 3 m/sec at 100° C. in nitrogen stream by means of an agitator with an inclined puddle wing for 10 hours, to produce a spinning solution of a weight ratio of PVA/PAN of 50/50 and a polymer concentration of 20% by weight. The spinning solution was opaque under visual observation; the particle size was measured by the differential interference microscope, with the results that most of the particles were within a range of 2 to 50 $\mu$m; the particle sizes measured by the methanol solidification method were within a range of 3 to 10$\mu$m. It was confirmed at a hot-water process that the PVA component was the component of the dispersing medium (sea component) while the PAN component was the component dispersed (islands component). The spinning solution was left to stand for defoaming for 8 hours, but it was verified that no tendency was observed that the dispersed particles would aggregate to grow into a larger particle and that the solution had an extremely stable phase structure.

Passing the spinning solution at 100° C. through a spinning nozzle of 1,000 orifices of a diameter of 0.08 mm to wet spin the solution in a solidifying bath of a DMSO/methanol weight ratio of 30/70 and at a temperature of 5° C., subjecting to wet drawing of 3-fold, extracting the DMSO contained in the yarn into methanol, passing the yarn through a final extraction bath composed of three components, namely methanol/ methyl isobutyl ketone (abbreviated as "MIBK")/water =55.8/38.2/6, adding an oiling agent to the resulting yarn, drying the yarn in hot air at 80° C. to obtain a spun yarn. Subsequently, the resulting spun yarn was subjected to dry heat drawing at 230° C. to a total draw ratio of 16 (the residence time in the dry heat drawing machine was 30 seconds), to recover a PVA/PAN blend fiber of a total 2,000 denier and 1,000 filaments. The fiber had a strength of 10.1 g/d and a Young's modulus of 190 g/d, wherein the PVA was the sea component and the PAN was the islands component. The microscopic examination of the cross section of the fiber indicated that a part of particles of a diameter larger than 0.4 $\mu$m had voids, on the periphery, in common to adjacent particles, as shown in FIG. 2.

The fiber then cut into pieces of a length of 2 mm was dispersed in water, followed by beating by means of the mixer for 5 minutes. The resulting beaten solution was observed with an optical microscope. Most of the fibers were fibrillated into a fibril of a size of about 1 $\mu$m. Further, the filtered water time of the beaten solution after the 5-min beating was measured to be 250 seconds. The fiber beatability defined by the present invention was within 2 minutes. The dispersibility of the beaten solution was excellent, with no formation of any fiber ball due to the tangle of fibrils to each other. By cutting the fiber of the present Example into 3-mm pieces, and beating the pieces by means of a refiner followed by paper making, a paper of a higher density and a higher strength was produced.

Crimping the fiber produced in the Example and cutting the resulting fiber into 51-mm pieces to produce a staple, carding the staple to prepare a card web, the card web was then subjected to a high-pressure water jet process at 80 kg/cm$^2$. Scanning electron microscopic observation of the surface of the resulting nonwoven fiber indicated that most of the fibers were fibrillated to a fibril of a size of about 1 $\mu$m. Using the nonwoven fabric to wipe the stain of a pair of glasses or on the front glass of an automobile, the stain was very cleanly wiped off. No problem developed even after washing the nonwoven fabric in water, so the fabric could be used as a wiper in a repeated fashion. Furthermore, the fiber was added to natural rubber followed by kneading to fibrillate the fiber for molding into a sheet. The fiber was more sufficiently fibrillated and more homogeneously dispersed in the rubber than the fiber of Example 1. The resulting sheet had a higher strength than that of Example 1.

Fibers were produced in the same manner as in the present Example, except that the final extraction bath was changed to a bath comprising methanol alone or a bath comprising MIBK alone. The fibers had almost the same strength and Young's modulus as follows; a strength of 9.8 g/d and a Young's modulus of 180 g/d (for methanol bath) or a strength of 9.7 g/d and a Young's modulus of 175 g/d (for MIBK bath). However, their beatability was as low as about 20 minutes.

EXAMPLE 5

The spinning solution was produced as in Example 4, except that the weight ratio of PVA/PAN was modified to 60:40. The spinning solution was opaque under visual observation. The observation of the phase structure with a differential interference microscope by the method described above indicated that most of the particles were within a range of 2 to 50 $\mu$m, while the particle sizes measured by the methanol solidification method were within a range of 2 to 8 $\mu$m. After the methanol solidification and hot-water process, it was confirmed that the PVA component was the component of the dispersing medium (sea component) and the PAN component was the dispersed component (islands component). The spinning solution was left to stand for 8 hours for defoaming, but no tendency was observed such that dispersed particles would aggregate to form a larger particle. It was thus confirmed that the spinning solution formed a thoroughly stable phase structure. The spinning solution of 100° C. was wet spun by passing through a spinning nozzle of 1,000 orifices of a diameter of 0.08 mm into the solidifying bath of a DMSO/methanol at a weight ratio of 30/70 at a temperature of 5° C., and was then wet drawn for 3-fold, followed by extraction of the DMSO contained in the yarn into methanol. Further passing the yarn through a final substitution bath of methanol/ MIBK/water (=65.8/28.2/6), and adding an oiling agent to the yarn, prior to drying in hot air at 80° C., a spun base yarn was recovered. Subsequently, the resulting spun yarn w as subjected to dry heat drawing at 230° C. to a final total draw ratio of 16 (the residence time in the dry heat drawing machine was 30 seconds), to produce a multi-filament of a total denier of 2,000 d and 1,000 filaments.

The fiber had a strength of 11.0 g/d and a Young's modulus of 210 g/d. The beatability of the fiber was 3 minutes, while the filtered water time after 5-min beating was 160 seconds, never involving the formation of any fiber ball. As shown in FIG. 2, the observation of the cross sectional fiber on a microscopic photograph demonstrated that a part of the particles of a particle diameter larger than 0.4 $\mu$m had voids, on the periphery, in common to adjacent particles. Furthermore, the size of the resulting fibril was about 1 $\mu$m.

EXAMPLE 6

A fiber was produced in the same manner as in Example 3, except that the final substitution bath was changed to a bath comprising methanol/MIBK/water (=22/66/12). The observation of the cross section of the resulting fiber clearly showed that the PVA was the sea while the PUMA was the islands, wherein voids were present in at least part of the boundaries with the sea component on the periphery of a part of the islands of a particle size larger than 0.2 $\mu$m, in between the sea component and the island components, and that most of the particles of a particle diameter larger than 0.4 $\mu$m in particular, had voids in common to adjacent particles. The strength of the fiber was 8.3 g/d, and the Young's modulus thereof was 170 g/d. The beatability of the fiber was 4.5 minutes, and the filtered water time after 5-min beating was 80 seconds, never involving any fiber ball formation.

Crimping the fiber as in the Example 4 and cutting the resulting fiber into 51-mm pieces to produce a staple, carding the staple to prepare a card web, the card web was then subjected to a high-pressure water jet process at 80 kg/cm$^2$. Scanning electron microscopic observation of the surface of the resulting nonwoven fiber indicated that most of the fibers were disintegrated into a fibril of a size of about 1 μm. Using the nonwoven fabric to wipe the stain of a pair of glasses and on the front glass of an automobile, the stain was very cleanly wiped off. No problem developed even after washing the nonwoven fabric in water, so the fabric could be used as a wiper in a repeated fashion.

ADVANTAGES OF THE INVENTION

In accordance with the present invention, a readily fibrillatable fiber readily fibrillable into super-fine fibrils of a size of about 1 m (about 0.01 dr if corrected in denier) is provided, by using as the principal polymer a general-purpose polymer, PVA, which is used at a greater amount as a raw material of vinylon fiber, and using and blending, in combination with the above polymer, a vinyl polymer non-compatible with the principal polymer, preferably PAN as a raw material of acryl fiber or PMMA as a raw material of acryl resin. A fiber having both the characteristic properties of the individual polymers and those of the super-fine fibrils can be produced, inexpensively and stably at an industrial scale.

As has been described above, the readily fibrillatable fiber of the present invention can be fibrillated when kneaded with organic- or in-organic particles, and can produce a mixture having great particle capturing properties and good reinforcing performance and additionally having good heat fusion resistance, so the fiber is useful as a friction material for use in brakes and clutch plates. Cement mixed with the fibril in dispersion may be used for a slate plate with a higher strength, because the fibril has higher capturing properties of cement particles as well as excellent reinforcing performance. Furthermore, by adding the fiber of the present invention to rubber prior to mastication and then applying mechanical shear force via for example mastication to the resulting mixture, the fiber can be fibrillated in the rubber and therefore exhibit satisfactory reinforcing effect of the rubber without any resorcin-formaldehyde-latex process because of the higher adhesivity of the polymers to rubber and the extremely large specific surface area owing to the fibrillation. It is needless to say that the fiber of the present invention can be used as a reinforcing fiber of rubber, cement, resin and the like, other than those described above. As has been mentioned insofar, the fiber of the present invention can be fibrillated to produce a sheet with excellent entanglement, by preparing the fiber into a paper by a wet-type process or into a dry card web, and subsequently applying high-pressure water jet onto the paper or the web. The sheet may be used as wiper, filter and the like.

The fibrillated sheet from the fiber of the present invention is very excellent in terms of density, shielding performance, opacity, wiping performance, water absorptivity, oil absorptivity, permeability to water vapor, heat retaining properties, high adhesivity, weatherability, high strength, high tear force, wear resistance, electrostatic controllability, draping performance, dyeability, safety and the like. Thus, the fiber of the present invention may be used for applications, including various filter sheets such as air filter, bug filter, liquid filter, vacuum filter, water drainer filter, and bacterial shielding filter; sheets for various electric appliances such as battery separator, condenser separator paper, and floppy disk packaging material; various industrial sheets such as FRP surfacer, adhesive tape base cloth, oil absorbing material, and paper making felt; various wiper sheets such as wipers for homes, services and medical treatment, printing roll wiper, wiper for cleaning copying machine, and wiper for optical systems; various medicinal and sanitary sheets, such as surgical gown, gown, covering cloth, cap, musk, sheet, towel, gauze, base cloth for cataplasm, diaper, diaper liner, diaper cover, base cloth for adhesive plaster, wet towel, and tissue; various sheets for clothes, such as padding cloth, pad, jumper liner, and disposable underwear; various life material sheets such as base cloth for artificial leather and synthetic leather, table top, wall paper, shoji-gami (paper for paper screen), blind, calendar, wrapping, portable heater (kairo) bag and packages for drying agents, packages for insecticides, packages for aroma agents, shopping bag, wrapping cloth (furoshiki), suit cover, and pillow cover; various agricultural sheets, such as cooling and sun light -shielding cloth, lining curtain, sheet for overall covering, light-shielding sheet and grass preventing sheet, wrapping materials of pesticides, pots for seeding growth, and underlining paper of pots for seeding growth; various protection sheets such as fume prevention musk and dust prevention musk, laboratory gown, and dust preventive clothes; various sheets for civil engineering building, such as house wrap, drain material, filtering material, separation material, overlay, roofing, tuft and carpet base cloth, dew prevention sheet, wall interior material, soundproof or vibration proof sheet, wood-like board, and curing sheet; and various automobile interior sheet, such as floor mat and truck mat, molded ceiling material, head rest, and lining cloth; and the like.

What is claimed is:

1. A readily fibrillatable fiber of a sea-island cross-section structure, comprising a vinyl alcohol polymer (A) and a vinyl polymer (B), which is not swellable by water, wherein the polymer component (A) is the sea component of the fiber containing, in its cross-section, a plurality of island components constituted of polymer component (B), the fiber having a strength of 6 g/d or more and a beatability of 30 minutes or less.

2. The readily fibrillatable fiber according to claim 1, wherein the polymer component (B) contains no vinyl alcohol units.

3. The readily fibrillatable fiber according to claim 1, wherein the polymer component (B) is an acrylonitrile polymer.

4. The readily fibrillatable fiber according to claim 1, wherein polymer component (B) is a (methyl methacrylate) polymer.

5. The readily fibrillatable polymer according to claim 1, wherein at least some of the islands formed by polymer (B) of the cross-sectional structure of the fiber are at least partially surrounded on their peripheries by void spaces.

6. The readily fibrillatable fiber according to claim 1, wherein the fiber has a filtered water time after 5-min. of beating of 75 seconds or more.

7. The readily fibrillatable fiber according to claim 1, wherein, in some areas of the cross-sectional structure of said fiber, at least several island structures have their peripheries at least partially surrounded by a single void space, with some islands fully surrounded by void space.

8. The readily fibrillatable fiber according to claim 1, wherein the vinyl alcohol unit content of polymer component (A) is at least 70 mol. %.

9. The readily fibrillatable fiber according to claim 8, wherein the vinyl alcohol units of polymer component (A) are copolymerized with less than 30 mol. % of comonomer units selected from the group of monomers consisting of ethylene, vinyl acetate, itaconic acid, vinyl amine, acrylamide, vinyl pivalate, maleic anhydride and a vinyl monomer containing a sulfonic acid group.

10. The readily fibrillatable fiber according to claim 3, wherein the acrylonitrile content of said polymer is at least 70 mol. %.

11. The readily fibrillatable fiber according to claim 10, wherein said acrylonitrile polymer contains less than 30 mol. % of at least one other monomer unit selected from the group consisting of (meth)acrylate esters, vinyl esters, vinyl compounds excluding vinyl esters, unsaturated carboxylic acids and sulfonic acid group containing vinyl compounds.

12. The readily fibrillatable fiber according to claim 4, wherein said (methyl methacrylate) polymer contains at least 80 mol. % methyl methacrylate.

13. The readily fibrillatable fiber according to claim 12, wherein said methyl methacrylate monomer is copolymerized with less than 20 mol. % of methyl acrylate or ethyl acrylate.

14. A fibril produced from the fiber according to claim 1.

15. A method for producing a nonwoven fabric, comprising applying high-pressure water jet of 30 kg/cm$^2$ or more to a web at least partially containing the fiber according to claim 1, thereby fibrillating the fiber.

16. A method for producing a fiber-reinforced molded article, comprising adding and mixing the fiber according to claim 1 into any one of rubber, plastics and cement, thereby simultaneously fibrillating the fiber.

17. A method for producing the readily fibrillatable fiber of claim 16, comprising dissolving a vinyl alcohol polymer (A) and a vinyl polymer (B) different from the polymer (A) in an organic solvent to prepare a spinning solution, wet spinning or dry-jet wet spinning the resulting spinning stock solution into a solidifying bath of a mixture of a solidifying solvent having the solidifying potency of the two polymers and the organic solvent of the spinning solution, removing the organic solvent of the spinning solution from the fiber in an extraction bath, and drawing the resulting yarn, provided that the following conditions "I" to "III" should be met;

I. The spinning solution is of a phase separation structure in which particles of a particle size of 2 to 50 $\mu$m, comprising the solution of the polymer (B), are present in the solution of the polymer (A);

II. the solidifying solvent is an organic solvent and the solidifying bath includes the organic solvent of the spinning solution at 15 to 75% by weight; and III. the total draw ratio is 8 or more.

18. A method for producing a readily fibrillatable fiber according to claim 17, wherein the polymer (B) is a polymer with no water swelling, substantially never containing any vinyl alcohol unit.

19. A method for producing a readily fibrillatable fiber according to claim 17, wherein the polymer (B) is an acrylonitrile polymer.

20. A method for producing a readily fibrillatable fiber according to claim 17, wherein the polymer (B) is a poly (methyl methacrylate) polymer.

21. A method for producing a readily fibrillatable fiber according to claim 17, wherein the final substitution bath is a bath comprising three components of alcohols, ketones and water.

* * * * *